United States Patent [19]

Schoenwald

[11] Patent Number: 5,559,683
[45] Date of Patent: Sep. 24, 1996

[54] FLYBACK SWITCHING POWER SUPPLY WITH BOOTSTRAPPED GATE DRIVE

[75] Inventor: David S. Schoenwald, Los Gatos, Calif.

[73] Assignee: Apple Computer, Inc., Cupertino, Calif.

[21] Appl. No.: 316,282

[22] Filed: Sep. 30, 1994

[51] Int. Cl.$^6$ .......................... H02M 3/335; H02H 7/122
[52] U.S. Cl. ............................................. 363/21; 363/56
[58] Field of Search .................... 363/21, 56, 131, 363/49

[56] References Cited

U.S. PATENT DOCUMENTS

| | | | |
|---|---|---|---|
| 4,316,242 | 2/1982 | Colangelo et al. | 363/21 |
| 4,609,980 | 9/1986 | Hoffman | 363/20 |
| 4,761,812 | 8/1988 | Hollis et al. | 379/413 |
| 5,390,099 | 2/1995 | Rilly et al. | 363/16 |
| 5,394,017 | 2/1995 | Catano et al. | 307/66 |
| 5,424,932 | 6/1995 | Inou et al. | 363/21 |
| 5,459,652 | 10/1995 | Faulk | 363/49 |

*Primary Examiner*—Peter S. Wong
*Assistant Examiner*—Bao Q. Vu
*Attorney, Agent, or Firm*—Richard C. Liu

[57] ABSTRACT

Method and apparatus for providing bootstrapped gate drive voltage in a flyback switching power supply. Switching transients and ringing caused by leakage inductance and capacitance in the flyback transformer are captured and used to provide a boosted gate drive voltage for the flyback switch, resulting in lower on resistance and lower switching losses.

6 Claims, 2 Drawing Sheets

FLYBACK SWITCHING POWER SUPPLY WITH BOOTSTRAPPED GATE DRIVE

BACKGROUND OF THE INVENTION

The present invention pertains to high efficiency switching power supplies, particularly to flyback designs.

Switching power supplies are widely used in electronic devices. They convert unregulated power from batteries or other sources to a regulated voltage required to operate the device. Especially with battery operated hand held and portable devices, high efficiency is required to maximize battery life. When the input voltage may vary either below or above the desired output voltage, or isolation is desired between input and output, a flyback topology is commonly used.

The flyback topology uses a transformer and a switch fed from a direct current source. When the switch is closed, current flows in the primary winding of the transformer, building up magnetic flux in the core. When the switch is opened, the polarity of the voltage reverses, causing current to flow in one or more secondary windings of the transformer. This current induced in the secondary windings is rectified and filtered to produce DC output voltages. Output voltage regulation is obtained by using a feedback circuit from a selected output voltage to control the pulse width or the frequency of the switching action.

MOSFETs are commonly used as switches in switching power supplies. The on resistance of a MOSFET switch used in a flyback power supply is dependent its the gate to source voltage. At lower input voltages, such as in battery operation from 1 or 2 cells, the gate drive voltage is lower, and the on resistance of the MOSFET higher. This lower gate drive voltage results in higher on resistance, and introduces inefficiency in the operation of the supply, especially at low input voltages. Also, until recently, MOSFETs required a gate to source voltage of approximately 3 volts to achieve low on resistance.

What is needed is a flyback switching power supply that provides a high gate drive voltage, preferably higher than the input voltage, without a separate power supply to generate this higher voltage.

SUMMARY OF THE INVENTION

A flyback switching power supply uses a series diode and voltage clamp, to limit maximum voltage, connected to the switching transistor to provide an operating voltage higher than the input voltage by capturing switching transients and ringing on the primary winding of the flyback transformer generated when the switch turns off. This voltage is used to provide gate drive to the MOSFET switch, resulting in lower on resistance, and an on resistance that is constant over the input voltage range of the supply. This recycles the energy trapped in the leakage inductance and uses this energy which might otherwise be wasted to supply a higher operating voltage for the control circuit, and therefore provides a higher gate drive voltage.

Other objects, features, and advantages of the present invention will become more fully apparent from the following detailed description of the preferred embodiment, the appended claims, and the accompanying drawings.

DETAILED DESCRIPTION OF THE INVENTION

Figure 1:
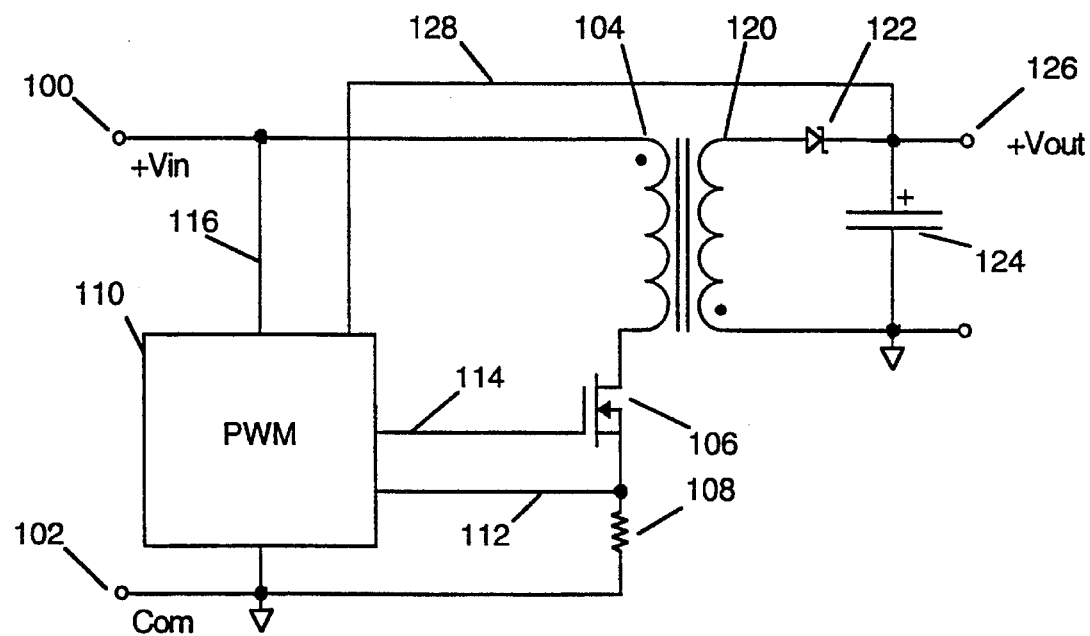
FIG. 1 is the schematic diagram of a flyback switching power supply.

FIG. 1 is the schematic of a conventional flyback switching power supply. Terminal 100 is the positive input voltage +Vin. Terminal 102 is the common negative terminal for input and output in a DC to DC converter. Input voltage +Vin is connected to one end of transformer primary winding 104. The other end of primary winding 104 connects to switch 106. Switch 106 is typically connected through current sense resistor 108 to common. FIG. 1 shows the use of a MOSFET such as the Siliconix SI9410 for switch 106, although a standard bipolar transistor can also be used. Power supply controller 110, known in the art, provides drive signal 114 to switch 106. A typical power supply controller chip is the MAX 770 from Maxim. Current flowing through the switch and primary winding is sensed on lead 112 by sensing the voltage drop across resistor 108. Secondary winding 120, with phasing indicated by dots, is connected to Schottkey rectifier diode 122 and filter capacitor 124 to produce output voltage +Vout 126 in the case of a positive output voltage. Lead 128 shows the feedback path from the output voltage to the power supply controller. Controller 110 is powered through lead 116 from the input supply +Vin.

In operation, controller 110 produces drive signal 114 to turn on switch 106. Current flows through optional sense resistor 108, switch 106, and transformer primary winding 104, building up magnetic flux in transformer primary winding 104. When controller 110 removes drive signal 114 turning off switch 106, the magnetic field in primary winding 104 transfers energy to secondary winding 120. This is rectified by diode 122 and filtered by capacitor 124 to produce output voltage +Vout 126. Sense lead 128 feeds back this output voltage to controller 110. Controller 110 regulates the output voltage to a predetermined value by controlling the on time, off time, or both, of switch 106. Sense resistor 108 is used to sense switching current in switch 106, and power supply fault conditions, and is optional.

Real world characteristics of components introduce inefficiencies into this design. Among these losses is the energy stored in the leakage inductance and capacitance in windings 104 and 120 when switch 106 turns off, and the on resistance of switch 106, which is a function of gate voltage.

When switch 106 is opened and the magnetic field generated in primary winding 104 collapses, leakage inductance generates ringing in both primary winding 104 and secondary winding 120. In primary winding 104, this ringing is superimposed on the positive supply voltage +Vin to generate positive excursions which exceed the supply voltage. Thus is it known in the art that switch 106 must have a much higher breakdown voltage than would normally be needed to meet the supply input voltage limits. For example, with a supply voltage +Vin in the range of 4 to 8 volts, as would be used with a small battery pack in a handheld device, short positive excursions during ringing on the order of 15 to 20 volts may be observed across switch 106 when it switches off.

When a MOSFET is used for switch 106, its on resistance is dependent on the gate voltage; the higher the gate voltage, the lower the on resistance, until saturation is reached. When a switching supply according to FIG. 1 is operated over a range of input voltages from 4 to 7 volts, the on resistance of switch 106 will be lower when the supply is operating at 7 volts than when the supply is operating at 4 volts. Lower on resistance in switch 106 means higher efficiency in the power supply, especially at input voltages near the low end of the power supply's operating range. Because the operating voltage for controller 110 in FIG. 1 is dependent on the input voltage, as the input voltage decreases, the gate drive voltage to switch 106 also decreases, resulting in an increase in the on resistance of switch 106, and a decrease in efficiency. One option now available to designers is the use of "low threshold" FETs, which have lower on resistance at lower drive voltages, but also have much higher costs and much higher drive losses than conventional FETs.

Figure 2:
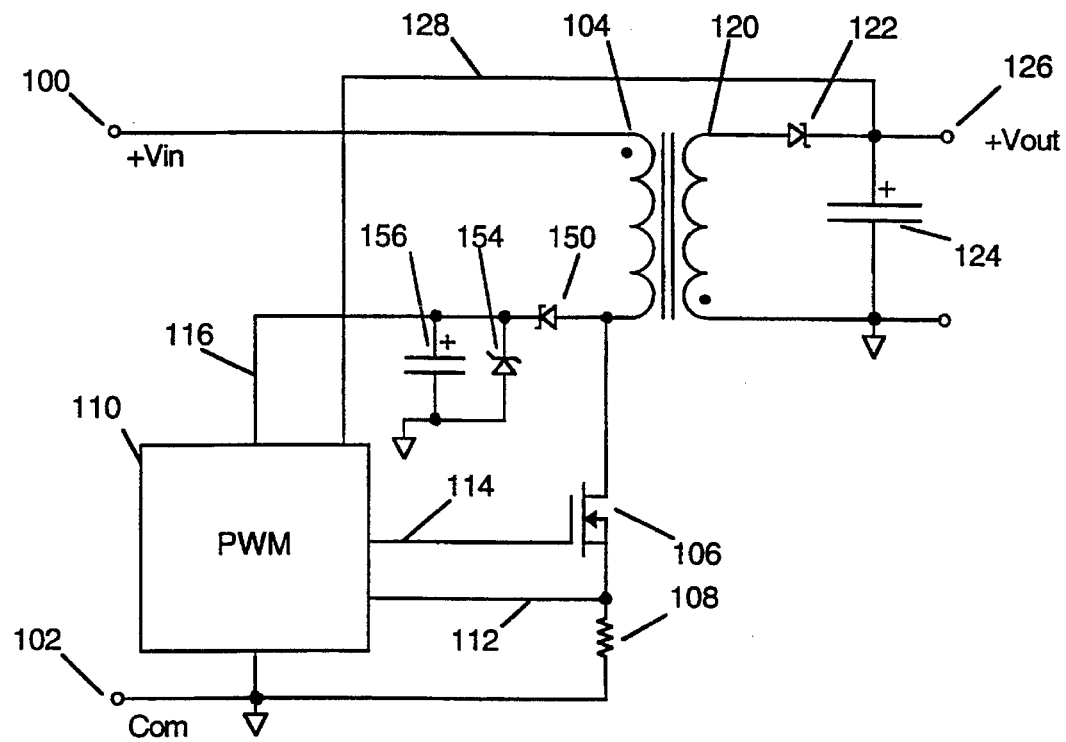
FIG. 2 is the schematic of a flyback switching power supply according to the present invention.

FIG. 2 shows the preferred embodiment of the present invention. In this embodiment, the typical input voltage +Vin is from 4 to 7 volts, and the output voltage +Vout is 5 volts. At the turnoff of switch 106 there is a ringing voltage in primary winding 104 which is used to provide a higher operating voltage for controller 110. This provides higher gate drive voltage for switch 106, which results in lower on resistances in switch 106, higher overall power supply efficiency, and the use of a less expensive MOSFET for switch 106. Diode 150 rectifies the voltage from the resonant ringing of winding 104 and switch 106. This rectified voltage is clamped and filtered by zener diode 154 and filter capacitor 156. While other forms of regulation may be used in place of zener diode 154, a very fast regulator must be used to clamp the voltage, as the ringing pulses are in the megahertz range.

When power is initially applied, the voltage across capacitor 156 will be the voltage drop of diode 150 below the input voltage +Vin, still high enough to start operation. In the presence of ringing in primary winding 104, which occurs after switch 106 is turned on and then off and the magnetic field built up in primary winding 104 collapses, the positive ringing voltage added to the power supply input voltage +Vin is passed by diode 150, clamped to the value of zener diode, and stored in capacitor 156. This provides an operating voltage for controller 110 that quickly ramps up to the operating voltage of zener diode 154, higher than the input voltage +Vin, and therefore provides a higher gate drive voltage for driving switch 106. In the preferred embodiment, a 1N5243 13 volt zener diode is used for diode 154, and either a Schottkey barrier diode or a fast signal diode such as a 1N4148 or 1N914 is used for diode 150. Capacitor 156 is typically from 0.1 microfarad to 1 microfarad.

On power up of the power supply in the present invention, the voltage across capacitor 156 is quickly bootstrapped from one diode voltage drop below the input voltage, which could be as low as 3.5 volts, to the value of the zener diode, 13 volts, which is from 6 to 9 volts above the 4 to 7 volt input voltage +Vin. Even at low input voltage, this higher voltage is used to drive switch 106. This high gate drive voltage insures the on resistance of switch 106 is low, minimizing losses in switch 106 at low input voltages.

Only a few milliamps of current is available at this boosted voltage, so a power supply controller chip with low quiescent and operating current, such as the Maxim MAX770 should be used. If such a low current controller is not used, the controller should be powered directly from input terminal 100, and a driver connected between control line 114 and the gate of switch 106. The driver is then powered from the boosted gate drive voltage present on capacitor 156. A simple totem-pole driver, known to the art, is adequate to efficiently drive the gate capacitance of switch 106.

While the invention has been described with reference to specific embodiments, it will be understood by those skilled in the art that various changes may be made, and equivalents substituted for elements thereof, without departing from the true spirit and scope of the invention. In addition, many modifications may be made without departing from the essential techniques of this invention as defined by the following claims.

What is claimed is:

1. In a switching power supply having an input terminal, a common terminal, a controller, a transformer primary having a top primary winding lead and a bottom primary winding lead, the top primary winding lead connected to the input terminal, a switch controlled by the controller, the switch connected between the bottom primary winding lead and common terminal, an improved drive voltage generator comprising:

a series diode connected to the junction of the bottom primary winding lead and the switch;

a capacitor connected between the output of the series diode and common; and a voltage clamp connected to the output of the series diode, the voltage clamp providing a bootstrapped voltage rising to a voltage higher than the voltage at the input terminal, the bootstrapped voltage being used to drive the switch.

2. The improved drive voltage generator of claim 1 where the voltage clamp is a shunt regulator.

3. The improved drive voltage generator of claim 2 where the shunt regulator is a zener diode.

4. The improved drive voltage generator of claim 1 where the voltage at the input terminal ranges from 3 to 7 volts and the bootstrapped voltage provided is greater than 9 volts.

5. The switching power supply of claim 1 where the bootstrapped voltage is used to power the controller.

6. In a switching power supply having an input voltage, a switch, and an inductor connected between the input voltage and the switch, the method of deriving a switch drive voltage higher than the input voltage comprising the steps of:

capturing the energy resulting from inductor switching transients;

adding the energy captured from the inductor switching transients to the input voltage to form a boosted voltage;

clamping the boosted voltage; and using the boosted voltage to drive the switch.

\* \* \* \* \*